United States Patent
Flynn

(10) Patent No.: US 10,326,645 B2
(45) Date of Patent: Jun. 18, 2019

(54) SYSTEM AND METHODS FOR CONFIGURATION MANAGEMENT

(71) Applicant: Level 3 Communications, LLC, Broomfield, CO (US)

(72) Inventor: Matthew David Flynn, Fort Collins, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 255 days.

(21) Appl. No.: 13/958,136

(22) Filed: Aug. 2, 2013

(65) Prior Publication Data

US 2013/0326029 A1    Dec. 5, 2013

Related U.S. Application Data

(63) Continuation-in-part of application No. 13/673,550, filed on Nov. 9, 2012, now Pat. No. 9,817,709.

(51) Int. Cl.
  *G06F 15/173* (2006.01)
  *H04L 12/24* (2006.01)
  (Continued)

(52) U.S. Cl.
  CPC ...... *H04L 41/0803* (2013.01); *G06F 11/0709* (2013.01); *G06F 11/0748* (2013.01);
  (Continued)

(58) Field of Classification Search
  CPC .......... G06F 11/0709; G06F 8/65; G06F 8/71; G06F 17/30115; G06F 9/44505; H04L 41/0806; H04L 67/125; H04L 41/0803; H04L 41/0893; H04L 43/0817; H04L 41/0672
  (Continued)

(56) References Cited

U.S. PATENT DOCUMENTS 5,678,002 A   10/1997  Fawcett et al.
5,926,619 A    7/1999  Badovinatz et al.
(Continued)

FOREIGN PATENT DOCUMENTS

EP    1397744 A2    3/2004
GB    2435362 A     8/2007
WO    WO-199503580 A1   2/1995

OTHER PUBLICATIONS

International Search Report, dated Feb. 7, 2014, Int'l Appl. No. PCT/US13/053455, Int'l Filing Date Aug. 2, 2013; Dkt. No. 0395-WO-02, 3 pgs.
(Continued)

*Primary Examiner* — Kyung H Shin

(57) ABSTRACT

Aspects of the present disclosure describe systems and methods for automatically configuring, managing, updating, and/or monitoring the configuration of various computing resources and/or network devices within a communications network, such as a telecommunications network. Configuration code may be deployed to a repository for a cluster of computing resources and one or more layers may be defined describing configurable aspects of the cluster. Subsequently, a script may be identified and executed to configure the cluster based on the configuration code.

14 Claims, 8 Drawing Sheets

Related U.S. Application Data

(60) Provisional application No. 61/678,959, filed on Aug. 2, 2012, provisional application No. 61/558,857, filed on Nov. 11, 2011.

(51) Int. Cl.
*G06F 11/07* (2006.01)
*H04L 12/26* (2006.01)

(52) U.S. Cl.
CPC ...... *G06F 11/0793* (2013.01); *H04L 41/0893* (2013.01); *H04L 41/069* (2013.01); *H04L 41/0672* (2013.01); *H04L 41/0677* (2013.01); *H04L 43/0817* (2013.01)

(58) Field of Classification Search
USPC .................. 709/224, 223, 220; 707/999.102, 707/999.203, 203; 717/104, 107, 174; 715/738
See application file for complete search history.

(56) References Cited

U.S. PATENT DOCUMENTS

| | | | |
|---|---|---|---|
| 7,287,192 B1 | 10/2007 | Engel | |
| 7,302,608 B1* | 11/2007 | Acharya | G06F 11/2023 714/13 |
| 7,321,992 B1 | 1/2008 | Vellore et al. | |
| 7,509,415 B2* | 3/2009 | Baekelmans | G06F 11/0709 709/223 |
| 7,571,349 B2 | 8/2009 | Levidow et al. | |
| 7,680,957 B1 | 3/2010 | Ketterhagen et al. | |
| 8,347,263 B1* | 1/2013 | Offer | G06F 8/71 717/104 |
| 8,548,956 B2 | 10/2013 | Allison et al. | |
| 2002/0078017 A1 | 6/2002 | Cerami et al. | |
| 2003/0051195 A1 | 3/2003 | Bosa et al. | |
| 2004/0078683 A1 | 4/2004 | Buia et al. | |
| 2005/0038818 A1 | 2/2005 | Hooks | |
| 2005/0125461 A1* | 6/2005 | Filz | G06F 8/65 |
| 2005/0138557 A1 | 6/2005 | Bolder et al. | |
| 2005/0257213 A1 | 11/2005 | Chu et al. | |
| 2006/0190579 A1 | 8/2006 | Rachniowski et al. | |
| 2006/0277340 A1* | 12/2006 | Mar | G06F 9/44505 710/104 |
| 2007/0130192 A1* | 6/2007 | Bolder | H04L 41/0806 |
| 2007/0156889 A1 | 7/2007 | Bhrara | |
| 2008/0016178 A1 | 1/2008 | Portugali | |
| 2008/0172421 A1 | 7/2008 | Birnbaum et al. | |
| 2009/0222466 A1 | 9/2009 | Allison et al. | |
| 2009/0328024 A1 | 12/2009 | Li et al. | |
| 2010/0057738 A1* | 3/2010 | Ianni | G06F 17/30115 707/E17.01 |
| 2011/0078576 A1* | 3/2011 | Jordan | H04L 67/125 715/738 |
| 2012/0166874 A1 | 6/2012 | Bernardez et al. | |
| 2013/0124908 A1 | 5/2013 | Gowin et al. | |
| 2018/0067795 A1 | 3/2018 | Gowin et al. | |

OTHER PUBLICATIONS

Written Opinion of the International Searching Authority, dated Feb. 7, 2014, Int'l Appl. No. PCT/US13/053455, Int'l Filing Date Aug. 2, 2013; Dkt. No. 0395-WO-02, 6 pgs.

International Preliminary Report on Patentability, dated May 13, 2014, Int'l Appl. No. PCT/US12/064473, Int'l Filing Date Nov. 9, 2012; Dkt. No. 0395-WO- 01 , 9 pgs.

International Preliminary Report on Patentability, dated Feb. 3, 2015, Int'l Appl. No. PCT/US13/053455, Int'l Filing Date Aug. 2, 2013; Dkt. No. 0395-WO-02 , 8 pgs.

Extended European Search Report, dated Dec. 18, 2015, Application No. 13824773.9, filed Aug. 2, 2013; Dkt. No. 0395-EP-02 , 8 pgs.

Extended European Search Report, dated Aug. 26, 2015, Application No. 12848305.4, filed Nov. 9, 2012; Dkt. No. 0395-EP-01, 7 pgs.

European Examination Report, dated Oct. 5, 2017, Application No. 13824773.9, filed Aug. 2, 2013; Dkt. No. 0395-EP-02 , 7 pgs.

Canadian Examination Report, dated Aug. 16, 2018, Application No. 2,854,339, filed Nov. 9, 2012; Dkt. No. 0395-CA-01 , 3 pgs.

International Search Report, dated Jan. 25, 2013, Int'l App. No. PCT/US12/64473, Int'l Filing Date Nov. 9, 2012, Dkt No. 0395-WO-01, 3 pgs.

Written Opinion of the International Searching Authority, dated Jan. 25, 2013, Int'l App. No. PCT/US12/64473, Int'l Filing Date Nov. 9, 2012, Dkt No. 0395-WO-01, 6 pgs.

European Examination Report, dated Sep. 22, 2016, Application No. 12848305.4, filed Nov. 9, 2012; Dkt. No. 0395-US-01, 11 pgs.

Summons to Attend Oral Proceedings, dated May 4, 2018, Application No. 12848305.4, filed Nov. 9, 2012; Dkt. No. 0395-EP-01 , 10 pgs.

European Examination Report, dated Dec. 1, 2016, Application No. 13824773.9, filed Aug. 2, 2013; Dkt. No. 0395-EP-02 , 5 pgs.

"Configuration File", Wikipedia Retrieved from the Internet: https://en.wikipedia.org/w/index.pho?title=Configuration_file&oldid=501178689 [retrieved Jun. 22, 2018]; XP055486909 Jul. 8, 2012 , 4 pgs.

Summons to Attend Oral Proceedings, dated Aug. 23, 2018, Application No. 13824773.9, filed Aug. 2, 2013; Dkt. No. 0395-EP-02 , 9 pgs.

* cited by examiner

| CLUSTER | CM-BIOS | CM-OS | CM-NETWORK | CM-COTS | CM-SYSADMIN | CM-APPS |
|---|---|---|---|---|---|---|
| 201200.X | v1.1.1b | V1, 2.6.28.3-11ab, x86_64 | V1-bond, 2.08 | v1 | v1 | 4.8.21, fms-v1 |
| 1020.X | v1.2.0c | V1, 2.6.35.10-2ab, x86_64 | V1-nobond, 2.08 | v1 | v1 | 4.8.9, fms+caching-v1 |
| 22011.8 | v2.1.2 | V2, 2.6.28.3-11ab, x86_64 | V1-nobond, 1.60 | v1 | v1 | 4.8.9, fms+caching-v1 |

CONFIGURATION MANAGEMENT TABLE

800

SYSTEM AND METHODS FOR CONFIGURATION MANAGEMENT

CROSS REFERENCE TO RELATED APPLICATION

The present non-provisional utility application claims priority under 35 U.S.C. § 119(e) to co-pending provisional application No. 61/678,959 entitled "Systems And Methods For Configuration Management," filed on Aug. 2, 2012, and which is hereby incorporated by reference herein.

The present application is also a continuation-in-part application claiming priority under 35 U.S.C. § 120 to utility application Ser. No. 13/673,550 entitled: "Systems And Methods For Automatic Replacement And Repair Of Communication Network Devices", filed on Nov. 9, 2012, which claims benefit of priority under 35 U.S.C. § 119 (e) from U.S. provisional patent application No. 61/558,857, filed Nov. 11, 2011, entitled "Systems And Methods For Automatic Replacement And Repair Of Communication Network Devices". All of the aforementioned patent applications are incorporated by reference herein for all purposes.

TECHNICAL FIELD

Aspects of the present disclosure relate to communications networks, and in particular, to systems and methods for the automatic repair, replacement, and/or configuration of network devices within a communications network.

BACKGROUND

Communications networks provide voice and data communication between various types of computing devices including telephones, voice over IP (VoIP) phones, smart phones, tablets, personal computers, data servers, content servers, web servers and other possible end points. To provide such connectivity, most communication networks include a plurality of network devices, such as switches, routers and servers, interconnected by transmission links. When a device is first installed in the network, it often requires some form of configuration. Over time and in order to ensure quality service, the various network devices may require repair, replacement, and/or reconfiguration.

When a communications network experiences interruption in service due to one or more problematic network devices, manual intervention by one or more system administrators is usually required to correct the problem. For example, a system administrator may monitor a communications network in an attempt to identify any failed network devices. When such a device is identified, the system administrator proceeds by manually attempting to perform any repair and/or replacement procedures necessary to restore the device.

Configuration management generally describes the process for establishing, maintaining consistency, and improving a network's performance throughout the network's life by way of managing the configurations of the various network elements. As with repairs, typically, system administrators have to manually intervene to configure and/or reconfigure network equipment. Such manual intervention by the system administrator is disruptive, time-consuming, expensive, and in some cases labor intensive It is with these observations in mind, among others, that various aspects of the present disclosure were developed.

SUMMARY

Aspects of the present disclosure include methods configuration management. The method includes deploying at least one package including code corresponding to a cluster of resources deployed within a communications network. The method further includes obtaining a script corresponding to the cluster, the script defining at least one configuration for the cluster. The method includes assigning the script to a specific version of a layer defining a configurable aspect of the cluster.

Aspects of the present disclosure include a configuration management system. The system includes at least one processor to deploy at least one package including code corresponding to a cluster deployed within a communications network, the cluster including one or more servers. The at least one processor is further configured to generate a script corresponding to the cluster, the script defining at least one configuration for the cluster. The at least one processor is configures to assign the script to a specific version of a layer defining a configurable aspect of the cluster.

Aspects of the present disclosure include non-transitory computer readable mediums including instructions for configuration management. The instructions, executable by a processor, include deploying at least one package including code corresponding to a cluster deployed within a communications network, the cluster including one or more servers. The instructions further include generating a script corresponding to the cluster, the script defining at least one configuration for the cluster. The instructions include assigning the script to a specific version of a layer defining a configurable aspect of the cluster.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

The present disclosure describes systems and corresponding methods for automatic repair, replacement, and/or configuration of network devices within a communications network. In various aspects, a repair automation system receives one or more indications of one or more errors associated with an inoperative, failed, and/or otherwise unavailable network device within the communication network. The repair automation system may classify the errors as hardware related and/or software related, and automatically identifies one or more repair procedures that may be performed to repair the failed network device. Subsequently, the repair automation system may automatically attempt the identified procedures. Alternatively, the repair automation system may provide data describing the identified errors and corresponding repair procedures to other external systems capable of performing such repairs and/or replacements. In various aspects, the repair automation system may determine that the network device is unavailable due to a lack of proper configuration within the communications network. Accordingly, the repair automation system may automatically identify and initiate one or more configuration procedures for the failed network device and automatically initiate such procedures.

In addition to enabling the automatic repair and replacement of network devices, aspects of the present disclosure include systems and methods for automatically configuring, managing, updating, and/or monitoring the configuration of various computing resources and/or network devices within a communications network, such as a telecommunications network. In one example, the system facilitates the use of layer definitions and scripts to automatically configure network elements, servers, or other devices within a cluster of devices. The configuration system then passes the appropriate parameters and definitions to the repair automation system, in one example, and the repair automation system may then configure the clustered elements. The discussion of FIGS. 1-4 following addresses repair automation, and the following discussion of FIGS. 5-8 focuses on configuration management.

Figure 1:
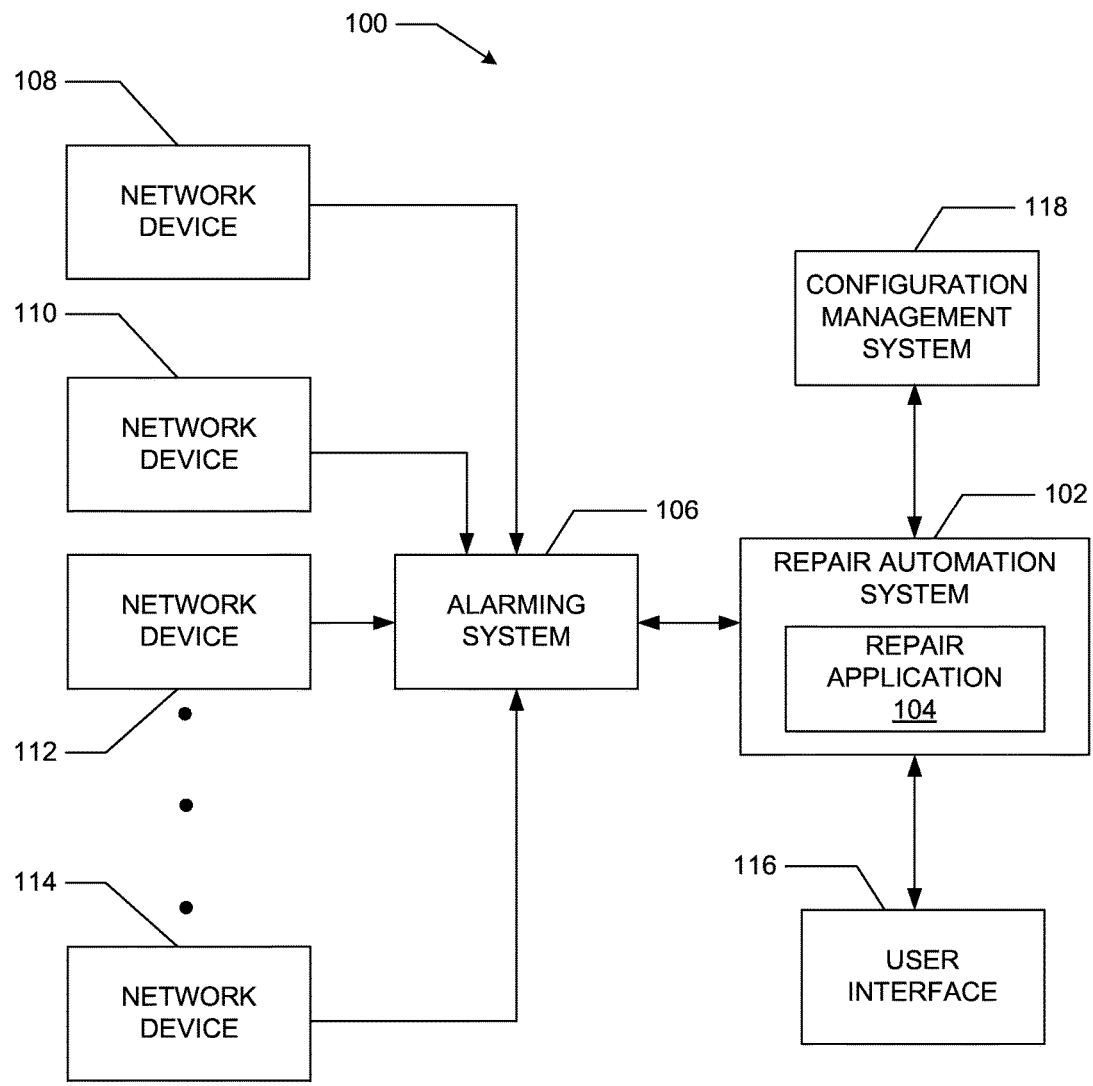
FIG. 1 is a block diagram illustrating a communications network, according to aspects of the present disclosure.

FIG. 1 illustrates an example communications network 100 comprising various network devices 108-114 capable of being monitored, repaired, replaced, and/or configured by a repair automation system 102. The communications network 100 may be a telecommunications network, the Internet, an intranet, a local area network, a wireless local network, or any other type of communications network, as well as combinations of networks. For example, in one particular embodiment, the communications network 100 may be an optical telecommunications network and each network device 108-114 may represent one or more: boxes, switches, routers, fiber optical links, and/or other optical telecommunications network devices that connect together to enable receiving and transmitting of data between various end users. As used herein, a box refers to a physical unit/machine that includes one or more processors, disk drives, memory, controllers, etc., capable of executing one or more applications, such as servers, server applications, etc. A box may also be generally described as including both hardware and software components and generally described as a server. The communications network may also encompass a data center in which many such network devices reside.

The repair automation system 102 includes various hardware and/or software computing components that may be used to monitor, repair, replace, and/or configure the network devices 108-114 within the communications network 100. In particular, the repair automation system 102 may receive an indication of an inoperative, failed, and/or unavailable network device. Subsequently, the repair automation system 102 may automatically identify and initiate one or more repair and/or configuration procedures to restore any network devices that may have failed within the communications network 100. Alternatively, the repair application 104 may automatically initiate a replacement process for any failed network devices that cannot be repaired or configured. The repair automation system 102 performs such procedures automatically with no or minimal manual intervention by network administrators, technicians and the like.

The repair automation system 102 may receive an indication from an alarming system 106 that one or more network devices within the communications network 100 are inoperative in some way. For example, the alarming system 106 may receive alarm data that a network device has failed. Alarm data may include log files, messages, events and/or other data describing or indicating an error and the type of error that caused the network device to fail. In one aspect, the alarming system 106 may retrieve messages, tokens, and/or the like, from the failed network device indicating the occurrence of a specific type of failure. Subsequently, the alarming system 106 may transmit a message or otherwise communicate to the repair automation system 102 describing the particular network device that has failed and any corresponding errors that may have caused the failure. For example, the alarm system 106 may retrieve a log file from a server A, indicating that the server has failed because an application executing on the server has timed-out. The alarm system 106 may generate a message indicating that server A has failed due to the failure of an application and transmit the message to the repair automation system 102. While the alarming system 106 is depicted in FIG. 1 as being external to the repair automation system 102, it is contemplated that the alarming system may be included within the repair automation system 102.

Alternatively, the repair automation system 102 may receive notification of an inoperable or otherwise malfunctioning network device from a network administrator. The network administrator may enter network device data into a user-interface (UI) 116. The UI 116 may be presented through a computing device with a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input from a user and providing output to a user. The network device data notifies the repair automation system 102 that there is a problem with one or more network devices within the communications network 100, and thus, the repair automation system 102 should attempt to repair and/or configure the device.

In various aspects, the repair automation system 102 may communicate with a configuration management system 118 to initiate the configuration of one or more network devices in the communications network 100. The configuration management system 118 automatically configures, tracks, and updates the configuration for various network devices within the communications network 100. As will be explained in detail below, "Configuration" defines the specific arrangement, characteristics, and settings of a particular network device that determine how the network device will operate within the larger communications network 100. For example, in optical communications networks, optical routers and servers are routinely configured for a specific purpose. Although the configuration management system 116 is depicted in FIG. 1 as being external to the repair automation system 102, it is contemplated that the alarming system may be included within the repair automation system 102.

Figure 2:
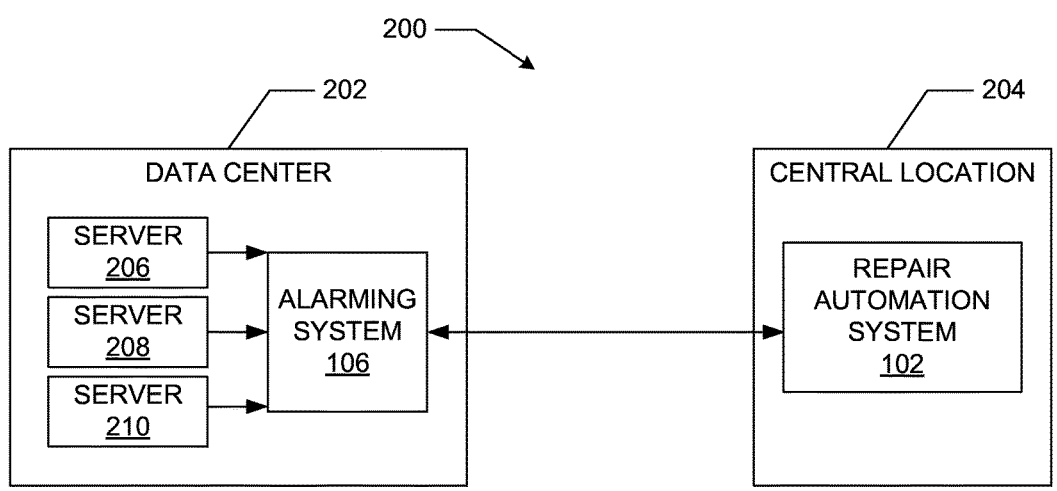
FIG. 2 is another block diagram illustrating another communications network and a repair automation system, according to aspects of the present disclosure.

FIG. 2 is an illustration of an exemplary embodiment of the repair automation system 102 according to aspects of the present disclosure. As shown in FIG. 2, one or more servers 206-210 (network devices) and the alarming system 106 may be located at a data center 202 within the communications network 100. The servers 206-210 are communicatively connected to the alarming system 106. When the alarming system 106 identifies some problem with one of the network devices (e.g., one of the servers 206-210 fails), the alarming system 106 transmits data indicating the failure of the network device to a remotely located central location 204 comprising the repair automation system 102. In this context, the repair automation system may be geographically remote from the data center or may be within the same data center facility. Being remote simply means that the repair automation system does not reside on one of the servers experiencing a failure. The alarming system 106 may transmit information to the repair automation system over a local network or a geographically dispersed network such as a wide area network like the Internet. Such communications may be transmitted over any type of wireline and/or wireless link configured within the communications network 100 such as a fiber optic link, and any other network devices necessary to transmit such data. While FIG. 2 only shows one data center 202, it is contemplated that multiple data centers capable of communicating with the repair automation system 102 may be included within the communications network 100. Additionally, in an extensive communication network, for the purposes of redundancy or otherwise, more than one repair automation system may be deployed. Finally, while FIG. 2 illustrates that the repair automation system 102 receives indication of a problem corresponding to one of the network devices (e.g., one of the servers 206-210) from the alarming system 106, it is contemplated that the repair automation system 102 may identify such problems by directly accessing the network devices, such as for example, by occasionally polling and/or checking the network devices, etc.

Figure 3:
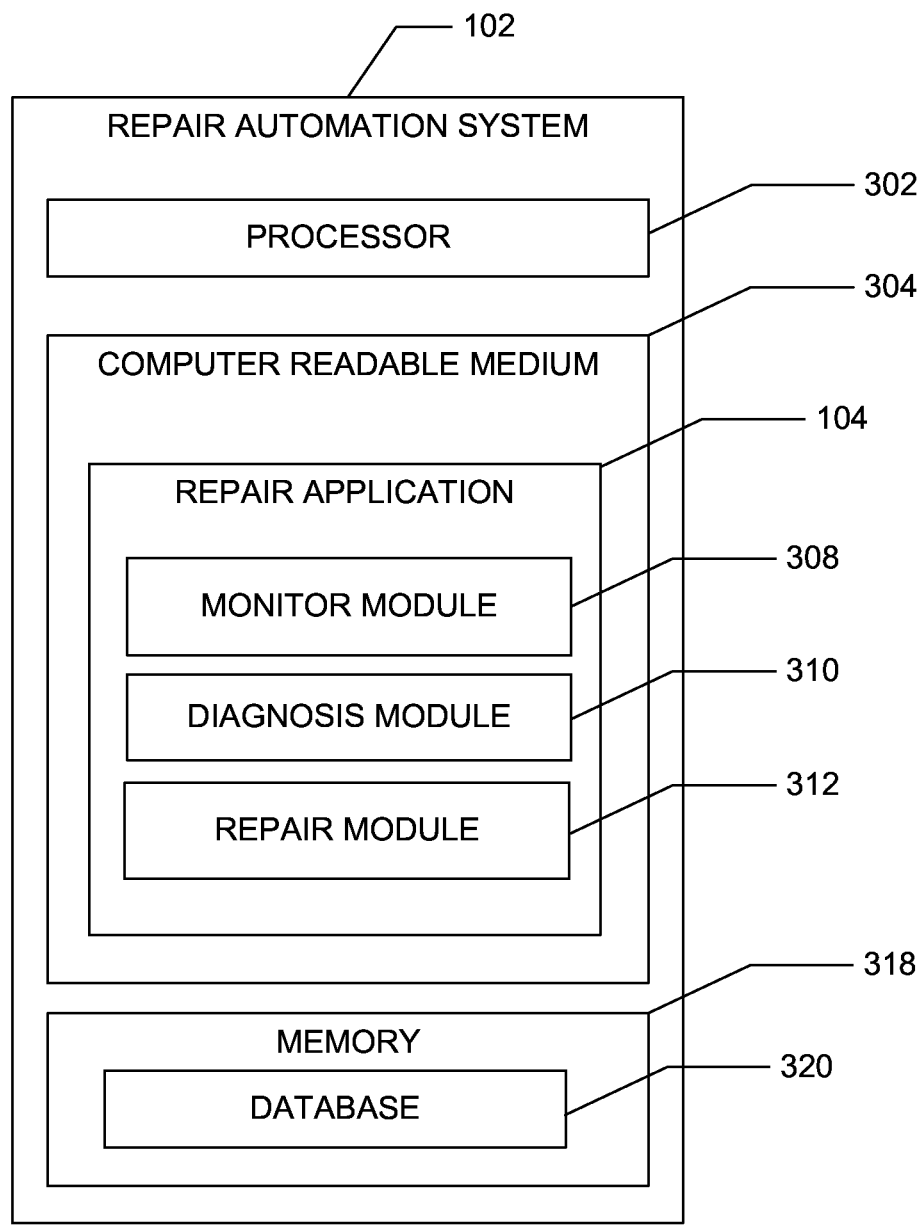
FIG. 3 is a block diagram illustrating a repair automation system, according to aspects of the present disclosure.

FIG. 3 is a block diagram illustrating the various hardware and/or software components of the repair automation system 102 according to aspects of the present disclosure. The repair automation system 102 may include a processor 302 that may be used to execute the repair application 104 that automatically initiates various repair, replacement, and/or configuration procedures for failed network devices. The processor 302 may include memory and/or be in communication with a memory 318, which may include volatile and/or non-volatile memory. The processor 302 may also include various other computing components. In one possible example, the processor is part of a server that runs the repair automation system.

The repair automation system 102 includes or otherwise has access to a database 320. The database 320 may be a general repository of data including network device configuration data, network device identification data, network device diagnostic data and/or other data relating to the identification and/or profile, errors, and configuration of a particular network device located within a communications network. The database 320 may include memory and one or more processors or processing systems to receive, process, query and transmit communications and store and retrieve such data. In another aspect, the database 320 may be a database server.

According to one aspect, the database 320 may contain one or more profiles for each network device in the communications network 100, including any network device identified as being problematic within the communications network 100. For example, for a communications network including four different servers, the database would include four different server profiles, each server profile corresponding to one of the particular servers within the communications network. In the example, the differences between the servers may include differences between the hardware of the server, the operating system running on the server, the file system running on the server, etc. A profile may include information that uniquely identifies a particular network device. For example, the profile may include an Internet protocol ("IP") address that uniquely identifies a network device. Alternatively, a network service access point address (NSAP) may be used. Other types of unique identifiers may be used to identify network devices, such as physical addresses, name identifiers, etc., and it is contemplated that any type of unique identifier may be included in a profile for network device identification. The profile may also include information describing the initial setup and/or configuration of the various hardware, software, and/or logical components within the network device. For example, the profile may include configuration information such as: hardware component configuration data; network communication configurations; available memory; storage space size; time stamp data; application association data (or versions thereof and/or one or versions of an application); application configuration data; firmware data; etc. Other configuration data may also be included. In yet another aspect, any errors and error data related to a particular network device may be stored in the database 320.

The repair automation system 102 may include a computer readable media ("CRM") 304 storing executable instructions to implement the repair application 104. The CRM 304 may include computer storage media, communication media, and/or another available media medium that can be accessed by the processor 302. For example, CRM 304 comprises computer storage media and communication media. By way of example and not limitation, computer storage media includes memory, volatile media, nonvolatile media, removable media, and/or non-removable media implemented in a method or technology for storage of information, such as computer readable instructions, data structures, program modules, or other data. Communication media includes computer readable instructions, data structures, program modules, or other data and include an information delivery media or system. The repair application 104 may include includes instructions or modules executable by the processor 302. Generally, program modules include routines, programs, objects, components, data structures, etc., that perform particular tasks or implement particular abstract data types.

In various embodiments, the repair application 104 may include a monitor module 308 that receives an indication and/or an alert that one or more network devices in a communications network is down, failed, and/or is otherwise unavailable. For example, the monitor module 308 may receive a message from the alarming system 106 indicating that a particular server is down in the communications network 100. As another example, the monitoring module 308 may receive a message from a communications network system administrator indicating a server within the communications network has failed.

Alternatively, the monitoring module 308 may periodically establish communication with various alerting systems and/or other external systems, applications, databases, etc., that may currently be monitoring the various network devices within a communications network 100 for errors, failures, etc. For example, the monitor module 308 may periodically or temporally establish communication with the alarming system 106 to pull information related to each network device monitored by the alarming system 106. Subsequently, the monitor module 308 may evaluate the pulled information to identify any problems and/or errors that may be present with any network devices.

When the monitor module 308 receives an indication of, or otherwise identifies a down, failed, and/or unavailable network device, the monitor module 308 automatically initiates a diagnosis module 310 to query the database 310 and obtain a profile, or known configuration data corresponding to the identified failed network device. More particularly, information articulating how the server was initially configured and what the device's original purpose was within the network may be obtained. For example, if the diagnosis module 310 received indication of a failed server C, the diagnosis module 310 may query the database 310 to obtain profile data comprising: the server C's unique identifier (e.g., an internet protocol address); any applications that are being executed on the server and related application configuration data; hardware configuration data; and/or the like. It is contemplated that any data related to describing the basic configurations of a network device in relation to the overall communications network in which the network device sits may be included in the profile data.

Once profile data for the identified network device has been obtained, the diagnosis module 310 uses the profile data to establish communication with the identified network device to determine the status of the network device. In one aspect, the diagnosis module 310 may determine whether the communications network is available/unavailable on the network device. For example, after the diagnosis module 310 obtained profile data including and IP address for a particular server "Sev1", the diagnosis module 310 may use the IP address located in the profile data in conjunction with an SSH or ping protocol to establish communication with the server "Sev1" to determine whether Sev1 is available on the communication network. Any type of communication protocol that may be used in conjunction with profile data may be used to establish communication with the network device, as well as other known methods of establishing communication.

If the diagnosis module 310 cannot establish communication with the network device—e.g., the device is down, failed, and/or unavailable—the diagnostic module 310 may identify one or more hardware based repair procedures to get the network device running, responding, and/or executing in an acceptable state. For example, the repair module 312 may receive a message from the diagnosis module 310 identifying a server as unavailable, and in response automatically initiate a corresponding re-boot procedure to restart the server. Alternatively, the repair module 312 may determine that the network device cannot be repaired and thus, should be replaced. The diagnosis module 310 may store data describing the various repair and/or replacement procedures initiated in the database 320 as diagnosis data.

After any repair procedures have been performed by the repair module 312, the diagnosis module 310 may reattempt to connect with the network device to determine whether the network device is operating correctly or remains unavailable. If the network device remains in a malfunctioning or inoperative state, the repair module 312 may provide a message to one or more external systems indicating that further interaction with the network device is required. For example, the repair module 310 may generate a token and/or ticket, such as a troubleshooting ticket, and transmit the ticket to an external system for processing. Such external systems may include a processing device executing one or more business processes as part of a business process management system. A network communication administrator may obtain the ticket from the external system and manually attempt to repair the network device based on the procedure described in the troubleshooting ticket received from the diagnosis module 310. For example, the trouble ticket may direct a network administrator to manually press a button on the failed network device to manually power-cycle the network device.

The repair automation system 102 may enter a wait state with regard to the particular system that has failed until the ticket transmitted to the external system has been performed. To determine whether a ticket have been performed, the external system may push information describing any action taken to repair the failed network device to the repair automation system 102. Alternatively, the repair automation system 102 may occasionally poll the external system for ticket status updates. When it is determined that the any issues corresponding to the network device have been resolved, the repair automation system 102 may verify the current state of the failed system and continue. Thus, referring to the example above, the repair automation system 102 may occasionally poll the external system for information indicating that an administrator has manually pressed the button to power-cycle the network device.

Subsequently, the repair module 312 may send a message to the diagnosis module 310, instructing the diagnosis module 310 to reattempt connecting to the network device as described above. Alternatively, the message may provide information indicating the network device cannot be repaired and thus all components or at least a component (e.g., hard drive, controller, memory, or processor) should be replaced in the network device. In response, the repair module may generate a token/ticket indicating that a replacement of the failed network device and/or component within the network device is necessary and provide a message to an external system and/or a network administrator capable of making such replacements.

When the diagnosis module 310 connects to the network device and determines that the network device is now available, the diagnosis module 310 may forward a message to the repair module 312 to collect information regarding the current state of the network device. Generally, state information refers to any information related to a unique and/or particular configuration of information in a program or machine at a particular time. For example, the repair module 312 may retrieve state information for one or more applications executing on the network device at the time of failure, as the execution of such applications may have caused the network device to fail. The diagnosis module 310 may retrieve information that describes the state of the network device and/or any applications executing on the network device at failure such as: log files associated with applications executing on the network device; output files for various hardware/software components within the network device; time stamp data; debugging data; configuration files, etc. It is contemplated that any type of data related to the state software applications executable by and/or executing on the network device at the time of failure may be retrieved by the diagnosis module 310. In one aspect, the state information may indicate that the network device has already attempted one or more repair procedures. Thus, the diagnosis module 310 may identify one or more additional repair procedures different from those already attempted. The state information may be stored in the database 320 and/or another database.

The diagnostic module 310 may analyze, parse, and/or process the retrieved state information to identify any applications or related application errors that may have caused the network device to fail, and one or more corresponding repair procedures. If it is determined that the cause of the failure of the network device is due to the execution of one or more applications, the repair module 312 may attempt to restore the application back to an acceptable configuration state. Stated differently, the repair module 310 may execute one or more repair procedures to put the network device in a state that may successfully execute the identified applications. Additionally, the diagnostic module 310 may test, scan, and/or evaluate the various hardware components of the network device and their particular configuration within the network device, in conjunction with processing the state information to identify a repair procedure. For example, assume a server C failed because an application A, executing on server C was accessing bad blocks/sectors within a disk drive located in server C. The diagnostic module 310 processes state information and tests the hardware of server C and determines that the network device failed due to application A attempting to access bad disk drive sectors by analyzing the state information and identify a repair procedure that causes the operating system operating on server C to force application A to map around the bad blocks/sectors within the disk drive when executing. Additionally, the repair module 312 may automatically identify and initiate a repair procedure to clean out the bad sectors within the disk drive. Thus, going forward, server C will no longer crash due to application A attempting to access bad disk drive sectors during execution.

As another example, the repair module 312 may automatically determine that server C failed because it has insufficient memory to execute application A. In particular, the repair module 312 may determine that the memory available within the server C is below a required threshold level, and thus cannot properly execute application A. Accordingly, when application A is executed it is causing the network device to fail. The repair module 312 may automatically provide a message to an external system indicating that the memory needs to be replaced. In some instances, the configuration of the applications executing on the network device may be modified if it is determined that the application configuration is incorrect, due to programmer modifications, application bugs, etc. A reinstallation of the application and its associated configuration may resolve the issues corresponding to the network device. For example, referring to server C above, application A may be reinstalled and reconfigured in an attempt to resolve server C's failure issues.

Figure 4:
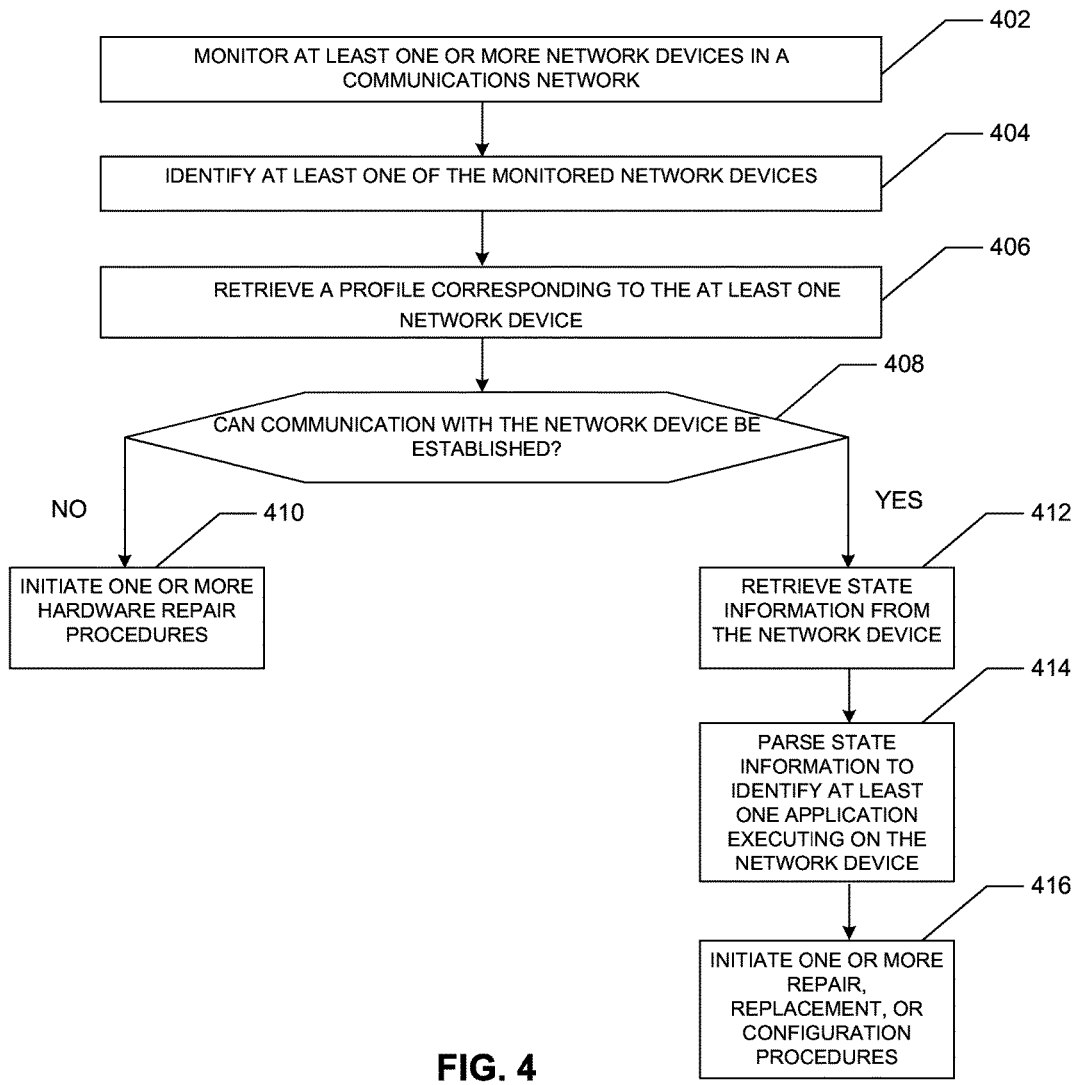
FIG. 4 is a flowchart illustrating an example process for monitoring, replacing, and/or repairing network devices in a communications network, according to aspects of the present disclosure.

FIG. 4 is a flow chart illustrating an example method for automatically repairing and/or replacing failed network devices within a communications network. The method may be used to automatically maintain the integrity of a communications network, such as a fiber-optic network comprising various network devices capable of receiving and transmitting data to end users. At block 402 one or more network devices within a communications network are monitored. Various methods may be used to monitor the network devices within the communications network. For example, the alarming system 106 may monitor the one or more network devices within the communications network 100 to identify whether any of the network devices are down, have failed, and/or become unresponsive. Alternatively, the repair application 104 may periodically retrieve data from the alarming system 106 and analyze the data to determine whether any network devices in the communications network have failed.

At block 404, at least one of the monitored network devices is identified and a profile corresponding to the network device is identified at block 406. For example, when the alarming system 106 determines that one of the network devices within the communications network 100 has failed, the alarming system 106 generates a message identifying the failed network device that may be received by the repair automation system 102. Subsequently, the repair automation system 102 executes a repair application 104 that queries a database 320 to identify a profile corresponding to the failed network device.

At decision block 408, the information in the profile is used to attempt to establish communication with the identified network device and determine the devices status. For example, the repair automation system 102 may use unique identifier information provided in the profile to connect to the corresponding network device to determine whether the network is available on the device. If no communication can be established and the network device status is considered unavailable, one or more hardware repair procedures are initiated to repair the network device at 410. For example, a repair procedure that re-boots the network device is initiated. Alternatively, if communication can be established with the network device and the network device's status is considered available, state information is retrieved from the network device at block 412. At block 412 the state information is parsed to identify at least one application executing on the network device that may have caused the device to fail. For example, log filed may be parsed to determine what execution cycle of the application caused the network device to fail.

At block 414 the identified application is restored to its properly executing state on the network device. At block 416, one or more repair, replacement, and/or configuration procedures are initiated to repair the network device based on the retrieved state information and the at least one application at 418. For example, the repair automation system 102 may initiate a replacement procedure to have the memory replaced in the failed network device.

In addition to enabling the automatic repair and replacement of network devices, aspects of the present disclosure include systems and methods for automatically configuring, managing, updating, and/or monitoring the configuration of various computing resources and/or network devices within a communications network, such as a telecommunications network. "Configuration" defines the specific arrangement, characteristics, and settings of a particular network device that determines how the network device will operate within the larger communications network. For example, in an optical communication network, servers and routers are routinely configured for a specific purpose. Accordingly, "Configuration Management" refers to the process for establishing and managing the performance and functional and physical attributes of various computing resources within a network.

Figure 5:
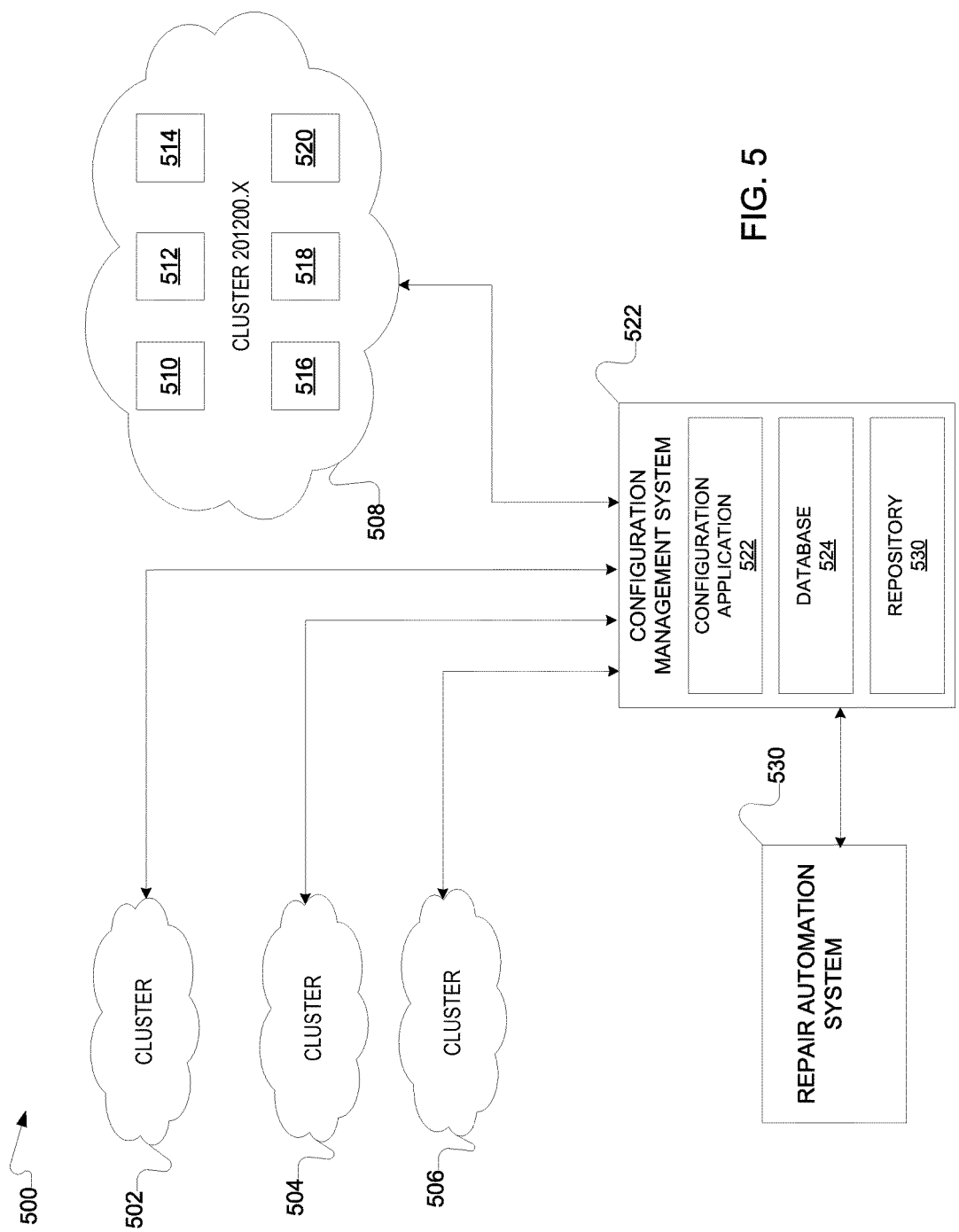
FIG. 5 is a block diagram illustrating a communications network including a configuration management system according to aspects of the present disclosure.

FIG. 5 illustrates a communications network 500 in which various aspects of the present disclosure may be practiced. In various embodiments, the communications network 500 may include one or more clusters 502-508. A cluster represents the logical orientation and/or arrangement of various computing resources and/or network devices, such as switches, routers, servers, etc., that share a common purpose, perform a function, and/or which may be executed together in some coordinated manner. For example, clusters of servers are often used in telecommunications to provide a specific service, such as content distribution and management. Common types of content distribution include standard caching, streaming, secure socket layer (ssl) secured data transmission, and the like. Using a cluster to provide such services improves performance and availability over that of a single computing resource, such as a single server. Accordingly, in one embodiment, the cluster 508 may include one or more servers 510-520 that may be loosely connected and logically arranged to perform and/or otherwise implement various tasks. Although the illustrated embodiment includes only servers within the cluster 508, it is contemplated that other types of resources may be included within a cluster, such as routers, switches, and the like, or some combination thereof.

The communications network 500 may be a conventional or IP-based telecommunications network, form a portion of the Internet, an intranet, a local area network, a wireless local network, a content distribution network, or any other type of communications network, as well as combinations of networks. For example, in one particular embodiment, the communications network 500 may be a telecommunications network including fiber-optic paths between various network elements, such as servers, switches, routers, and/or other optical telecommunications network devices that interconnect to enable receiving and transmitting of information between the various elements as well as users of the network.

A configuration management system 522, located within the communications network 400, and/or communicatively connected to the communications network 400 may include a configuration application 524 for managing the configuration of the various computing resources and/or network devices of the one or more clusters 502-508. The configuration management system 522 may include a database 526 for storing and retrieving configuration data, which may be used to configure one or more clusters of the communications network 500. Although the database 526 of FIG. 5 is depicted as being located within the configuration management system 522, it is contemplated that the database 526 may be located external to configuration management system 522, such as at a remote location, and may communicate with the configuration management system 522. Additionally, the configuration management system 522 may include a repository 528 containing configuration code, which as will be described in further detail below, may be executed to apply one or more configurations to one or more clusters 502-508 within the communications network 500.

In various embodiments, as will be described further in detail below, the configuration management system 522 may be configured to generate one or more layers that describes the high-level configurations and/or organizations of a cluster. More particularly, the one or more layers may identify a script, which when executed will perform various cluster configurations.

The configuration management system 522 may be in communication with a repair automation system 530 configured to automatically repair, replace, and/or configure various network devices currently deployed within a communications network, such as the communication network 500. A detailed description of the repair automation system 530 is presented herein with reference to FIGS. 1-4, and elsewhere. While the configuration management system 522 is illustrated as being in direct communication with the repair automation system 530, such as if the two systems resided on the same server or cluster of servers, it is contemplated that the configuration management system 522 and the repair automation system 530 may also communicate and coordinate actions by way of a network.

Figure 6:
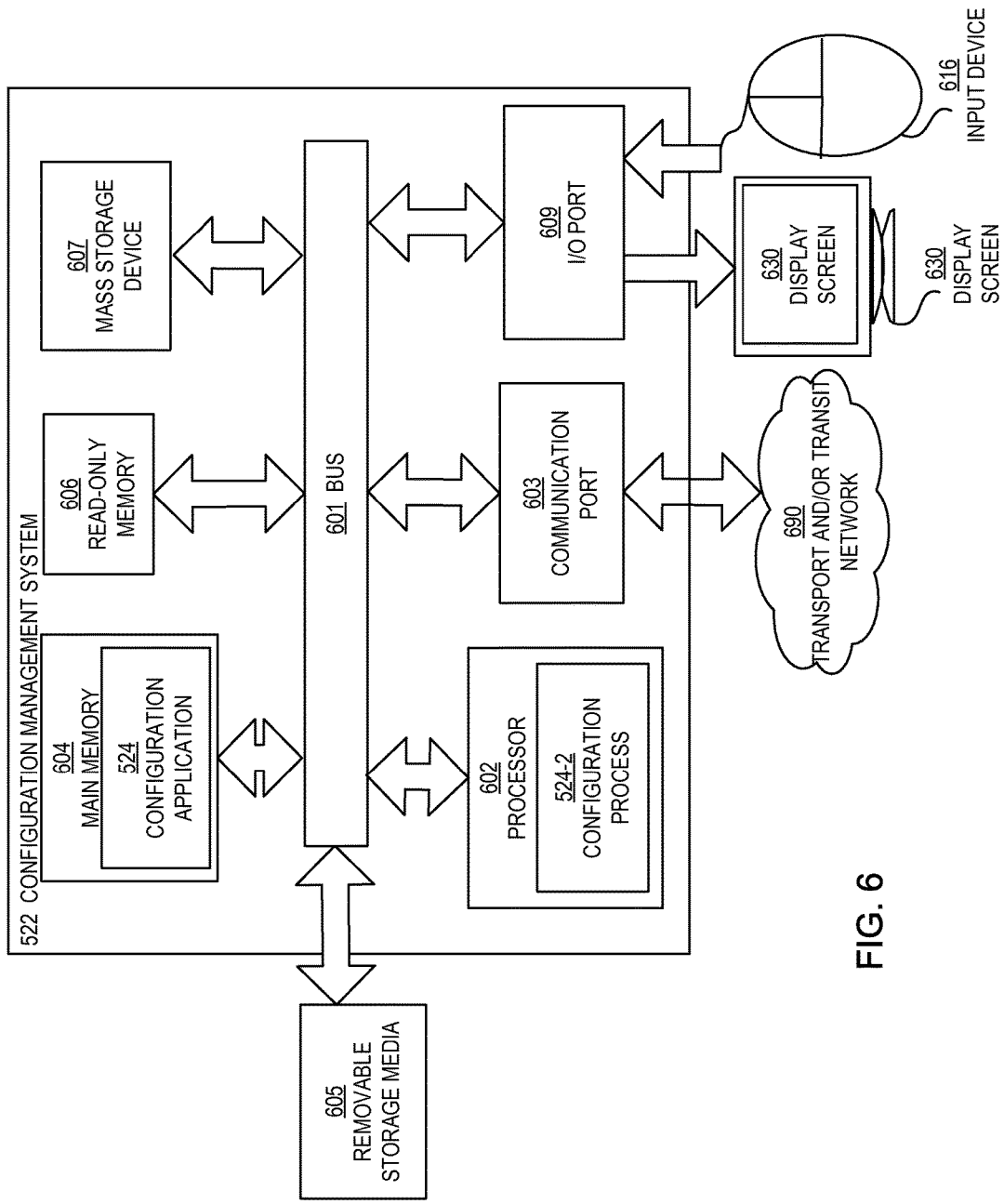
FIG. 6 is a block diagram of configuration management system according to aspects of the present disclosure.

FIG. 6 is a schematic diagram of the configuration management application 524, residing as a collection of executable code in memory and executable by one or more cores, processors, or other computing elements that may be used to implement and/or otherwise execute various aspects of the present disclosure according to one embodiment. In the specific example illustrated, the configuration management system 522 includes a bus 601 (i.e., interconnect), at least one processor 602, at least one communication port 603, a main memory 604, a removable storage media 605, a read-only memory 606, and a mass storage device 607. Processor(s) 602 can be any processor suitable for use in a server environment or otherwise capable of running a configuration management system and communicating with various possible network elements. Some examples, of suitable processors include, but not limited to, Intel® Itanium® or Itanium 2® processor(s), AMD® Opteron® or Athlon MP® processor(s), and Motorola® lines of processors. Communication port 603 can be any of an RS-632 port for use with a modem based dial-up connection, a 10/100 Ethernet port, a Gigabit port using copper or fiber, or a USB port. Communications port(s) 603 may be chosen depending on a network such as a Local Area Network (LAN), a Wide Area Network (WAN), or any network to which the computer system 600 connects. The configuration management system 522 may be in communication with peripheral devices (e.g., display screen 630, input device 616) via Input/Output (I/O) port 609.

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 101 can be a PCI/PCI-X, SCSI, or Universal Serial Bus (USB) based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory 604 is encoded with a configuration application 524 that supports functionality herein. For example, in one embodiment, the configuration application 524 may configure and/or reconfigure the computing resources included within a cluster of a communications network, such as the communications network 500. Configuration application 524 (and/or other resources as described herein) can be embodied as instructions such as data and/or logic instructions (e.g., computer executable instructions stored in the memory or on another computer readable medium such as a disk) that support processing functionality according to different embodiments described herein. During operation of one embodiment, processor(s) 602 accesses main memory 604 via the use of bus 601 in order to launch, run, execute, interpret or otherwise perform the logic instructions of the configuration application 524. Execution of configuration application 524 produces processing functionality in configuration process 524-2. In other words, the configuration process 524-2 represents one or more portions of the configuration application 524 performing within or upon the processor(s) 602 in the configuration management system 522.

It should be noted that, in addition to the configuration process 524-2 that carries out method operations as discussed herein, other embodiments include the configuration application 524 (the logic instructions and/or data). The configuration application 524 may be stored on a computer readable medium (e.g., a repository) such as a floppy disk, hard disk or in an optical medium. According to other embodiments, the configuration application 524 can also be stored in a memory type system such as in firmware, read only memory (ROM), or, as in this example, as executable code within the main memory 604 (e.g., within Random Access Memory or RAM). For example, configuration application 524 may also be stored in removable storage media 605, read-only memory 606, and/or mass storage device 607.

Figure 7:
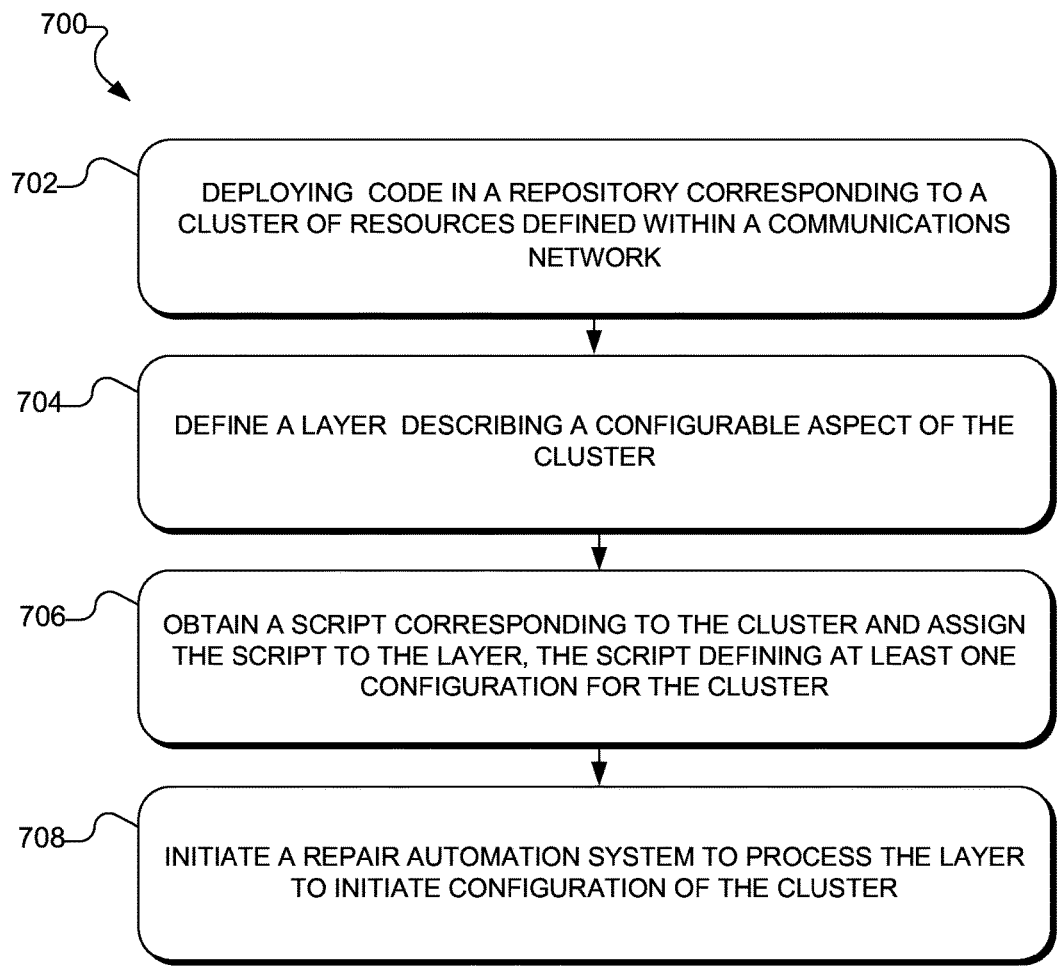
FIG. 7 is a flowchart illustrating an example process for performing configuration management, according to aspects of the present disclosure.

FIG. 7 provide an illustrative method and/or process 700 for managing the configuration of one or more resources currently deployed within a communications network that may be executed or otherwise performed by the configuration management system 522 of FIG. 5, or some other processor encoded with, or executing instructions of, the configuration application 524. As illustrated, process 700 begins with deploying configuration code, corresponding to a cluster of resources defined within a communications network, to a repository (operation 702). The code defines one or more configurations, updates, and or modifications that may be applied to the various resources within the cluster. Stated differently, the code may be executed or otherwise run on the various resources within the cluster to properly configure the cluster and its resources. For example, referring to the cluster 508 of FIG. 5, to configure the servers 510-520, configuration code may be run on the servers 510-520. The configuration code does not have to be applied to clusters only; there are cases where individual resources, such as an individual server, may only be configured. However, having the same configurations on all the servers in a cluster is desirable when the cluster is designed to achieve or perform a common task, such as content distribution.

A repository generally represents a storage location from which software packages may be retrieved and installed on a processing device, such as a server, computer, mobile device, and the like. Thus, as illustrated in FIG. 5, the code defining one or more configurations for a cluster of resources may be deployed to the repository 528 of the configuration management system 522.

In various embodiments, the code may be deployed as a package and/or in accordance with one or more packaging tools and/or systems, the use of which enables the code to be deployed in a consistent and simple manner. Stated differently, a package management system represents a collection of software tools that may be executed to automate the process of installing, upgrading, configuring, and removing software code from a processing device, such as a computer's operating system in a consistent manner. For example, the code may be store in a Red Hat Package Manager format ("RPM") in accordance with the Red Hat Package Management system, and may be accessed and manipulated using various package-management utilities, such as the Yellowdog Updater Modified ("YUM") utility. YUM represents a command-line interface that enables automatic updates, package and dependency management, on RPM-based distributions.

Referring again to FIG. 7, in addition to deploying configuration code, one or more layers corresponding to the cluster may be defined within the configuration management system (operation 704). A layer describes at least one high-level organization, functionality, and/or configuration for a cluster and the various computing resources included within the cluster. For example, referring to FIG. 4, a layer may define the high-level organization and/or function of the servers 510-520 of the cluster 508.

In various embodiments, a layer may be defined as one of six layer types. For example, a layer may be defined as a "hardware" layer that defines the type of hardware that should be used within a cluster. Alternatively, the layer may be defined as a "BIOS firmware" layer that defines one or more BIOS settings for a cluster. The layer may be defined as an "operating system" layer that defines a version of operating system, a kernel version, boot settings, and/or other operating system configurations for a cluster. The layer may be defined as a "network" layer that defines various network configurations for the cluster. The layer may be defined as an "applications" layer that defines what Commercial Off-The-Self ("COTS") software and/or proprietary footprint software that may be installed on a cluster and how it may be configured. COTS software is normally limited to specialized libraries or packages available within the CentOS operating system, which are not installed by default. The layer may be defined as a "system admin" layer that defines the system administrative configurations for the cluster and/or the cluster resources. Although only six layers have been described, it is contemplated that other layers may be defined, any of which may describe a high-level organization and/or functionality for a cluster.

Each layer may include or otherwise be associated with one or more versions. A version of a layer defines a specific value for one or more distinct layer variables. For example, in one embodiment, every type of layer (e.g. hardware, bios, operating system, etc.) may optionally include a "settings" variable that identifies an apply script, which as will be described in further detail below, will perform one or more configurations to the cluster. Referring to the six layer types defined above, the hardware layer, in addition to optionally including the "settings" variable, may also include a "type" variable within its definition that defines the various type of hardware a cluster should be employing. The BIOS layer may only include the "settings" variable that, which explained above, identifies an apply script configured to set the BIOS of the cluster. The operating system layer may include the "settings" variable, a "kernel" variable, and a "operating system" variable. The kernel variable defines the kernel that should be applied to the cluster as well as any supporting software. The operating system variable identifies the specific type of operating system that should be configured within the cluster, such as CentOS or Windows. The system admin layer may include the "settings" variable and a "software_release" variable, which refers to the version of software corresponding to system administration to be applied to the cluster by the apply script defined in the "settings" variable. The network layer may include the "settings" that identifies an apply script to configure the network aspects of the cluster. The applications layer may include the a "settings" variable and a "software_release" variable, which refers to the version of software to be applied to the cluster by the apply script defined in the "settings" variable.

An illustrative example of one or more layers will now be provided. Specifically, Table 1 entitled: "Version Layers", provides an examples of defined layers and any corresponding variables that may be set for a given layer to generate a version. The layers may be applied to one or more servers included within a cluster:

TABLE 1

Version Layers

HARDWARE, one variable version, TYPE
TYPE
* 1u_standard - 1U Chassis Size, PDSMU Motherboard, 1 CPU, 8GB Memory, 4 HDs (4-spin)
* 1u_standard_ssd - 1U Chassis Size, PDSMU Motherboard, 1 CPU, 8GB Memory, 4 HDs (3-spin, 1-ssd)
* 2u_standard - 2U Chassis Size, X8DT Motherboard, 2 CPU, 48GB Memory, 12 HDs (12-spin)
* 2u_standard_ssd - 2U Chassis Size, X8DT Motherboard, 2 CPU, 48GB Memory, 12 HDs (10-spin, 2-ssd)
* 2u_video - 2U Chassis Size, X8DT Motherboard, 1 CPU, 24GB Memory, 12 HDs (12-spin)
* 2u_video_ssd - 2U Chassis Size, X8DT Motherboard, 1 CPU, 24GB Memory, 12 HDs (10-spin, 2-ssd)
BIOS, one variable version, SETTINGS
SETTINGS
* standard_v1 - Sets BIOS per the Caching standard, except for hyper threading on for 4 hardcoded clusters (for Netflix-GC Trial)
OS, three variable version: SETTINGS, KERNEL, OS
SETTINGS
* standard_1cpu_v1 - Standard for all 1cpu servers, which is almost all 1Us - irqbalance off
* standard_2cpu_v1 - Standard for all 2cpu servers, which is all current 2Us - irqbalance enabled, with ONESHOT=>yes & IRQBALANCE_BANNED_CPUS=>2
KERNEL:
* 2.6.28.3-11ab - standard kernel for Blue
* 2.6.28.3-18ab - standard kernel for General, SSD, SSL, FMS
* 2.6.35.10-10ab - standard kernel for Netflix
* 2.6.35.10-16ab - trial kernel, used on 5.X
* 2.6.35.10-18ab - trial kernel, used on General tuning trial
OS:
* Blank, defaults to CentOS 5.3
* 5.3 - CentOS 5.3
* 5.9 - CentOS 5.9
NETWORK, one variable version, SETTINGS
SETTINGS
* standard_unbonded_v1 - Standard for almost all 1Us, NICs are unbonded, ringbuffer => off, tcp_init_cwnd=>10 [go
* standard_bonded_v1 - Standard for all 2Us, NICs are bonded, ringbuffer => off, tcp_init_cwnd=>10
* ipv6_bonded_v1 - Used on some 5.X clusters, NICs are bonded and have IPv6 address, ringbuffer => off, tcp_init_cwnd=>10
* ringbuffer_bonded_v1 - Used on cluster with 2.6.35.10-10ab kernel (Netflix), NICs are bonded, ringbuffer => on, tcp_init_cwnd=>10
* fasttcp_bonded_v1 - Trial, used on Cedexis clusters, NICs are bonded, ringbuffer => on, tcp_init_cwnd=>32
SYSADMIN, two part version, SETTINGS, CDNCFG_VERSION
SETTINGS
* standard_v1 - apply the cdncfg rpms
CDNCFG_VERSION
* webjob - apply cdncfgs via the webjob method and setup 4-hour update via webjob wjwrap, used on all 4.X servers
* sa-v1-NNN - repo staged, yum installed cdncfgs from the sa-v1-NNN build, used on all 5.X server
APPS, two part version, SETTINGS, SOFTWARE_RELEASE
SETTINGS, there can be a great number of these, but for the common ones:
* leapfrog_v1 - Production FP5.X leapfrog servers
* controlshim_v1 - Production FP5.X controlshims
* controshim_prototpe_v3 - FP5.X controlshim with the prototype network certs
* caching_1u_standard_v1 - Caching, 1U hardware (8GB, 4drives)
* caching_2u_standard_v1 - Caching, 2U standard hardware (48GB, 12drives)
* caching_2u_video_v2 - Caching, 2U video hardware (24GB, 12drives)
* netflix_2u_video_v1 - Netflix-Caching, 2U video hardware (24GB, 12drives)
* streaming_1u_standard_v1 - Streaming/FMS, 1U hardware (8GB, 4drives)
* streaming_2u_standard_v1 - Streaming/FMS, 2U standard hardware (48GB, 12drives)
* streaming_2u_video_v2 - Streaming/FMS, 2U video hardware (24GB, 12drives)
* source - use an inter-cluster peer or defined source server for configuration
* caching_2u_eng_wp_tuning_general_prototype
* dualpurpose_dec_2u_prototype
* dualpurpose_dec_4u_prototype
* itm_admin_prototype
SOFTWARE_RELEASE:
*4.8.27
*4.8.29

TABLE 1-continued

Version Layers

*4.10.2 (for ITM prototype testing)
*5.4.3.3
*5.4.3.12

As illustrated in the "Version Layers" table, the versions include a HARDWARE layer, that includes a "type" variable that describes the physical attributes of a server. The type can be defined as any one of the bulleted configurations. For example, the type variable could be set to "1u_standard-1U Chassis Size, PDSMU Motherboard, 1 CPU, 8 GB Memory, 4 HDs (4-spin)", which verifies that the hardware within the cluster should be a standard 1U chassis, with a PDSMU motherboard, include one processor, 8 GB of memory and 4 hard drives.

Additionally, as illustrated, the "Versions Layers" table includes a OS layer, that includes a "settings", "kernel", and" "OS" variable. The settings variable identifies an apply script, which when executed will configure the kernel and operating system of the servers within the cluster to the specific kernel versions and operating system defined within the "kernel", and" "OS" variables. For example, the OS variable may be defined as any one of the bulleted configurations provided in the table, such as 5.3-CentOS 5.3. Additionally, the OS variable may be defined as any one of the bulleted configurations provided, such as 2.6.28.3-11ab-standard kernel for Blue.

Figure 8:
FIG. 8 is an example configuration management table, according to aspects of the present disclosure.

The various versions and configurations for each particular layer corresponding to a given cluster may be stored in some type of data structure, such as the Configuration Management table 800 depicted in FIG. 8. As illustrated, the first entry in the table corresponds to cluster "201200.X." that includes layers CM-BOIS, CM-OS, CM-Network, CM-COTS, CM-SYSADMIN, and CM-APPS. Each layer includes a configuration or reference information. For example, the CM-BIOS layer corresponding to the cluster 201200.X includes information indicating that the BIOS layer should configured to a "v1" (version 1) and a firmware of 1.1b. For the SYSADMIN layer, the 201200.X cluster includes a configuration indicating v1 should be used to configure the SYSADMIN layer of the 201200.X cluster.

Referring again to FIG. 7, a script may be obtained and assigned to a particular layer of the cluster (operation 706). A script represents a file, executable, process, and/or program, that automates the execution of one or more tasks. In the context of configuration management, the script may automatically execute one or more functions, set and/or define variables, etc., that will configure various resources within the cluster, and in some instances, apply code defined within the repository 530 to configure the cluster in accordance with its assigned layer.

For example, referring to FIG. 5, a script may be generated corresponding to the cluster 508, which when executed may apply one or more configurations to one or more of the servers 510-520. Table 2 entitled: "Example Apply_Script" represents an example script that may be generated and applied to the servers 510-520 according to various embodiments:

TABLE 2

Example Apply_Scripts

OS
apply_script block, layer=os, version=standard_2cpu_v1
verify_centos_version(centos_version)
apply_os_rpms(rpms_version)
options = %w[ elevator=cfq numa=off ]
options.each do |option|
    apply_grub_option(option)
end
enable_autofsck
disable_telnet
disable_smartd
apply_irqbalance_option("ONESHOT", "yes")
apply_irqbalance_option("IRQBALANCE_BANNED_CPUS", "2")
enable_irqbalance
NETWORK
apply_script block, layer=network, version=standard_bonded_v1
verify_interfaces_bonded
verify_no_ipv6_networking
enable_network_script("standard")

In the "Example_Apply_Scripts" table illustrated above, an apply script for the OS layer and the network layer is provided. The OS apply script includes one or more functions and/or instructions to verify that the operating system of the servers within the cluster is the correct version. The functions of the apply script also ensure that the necessary software packages have been installed on the servers that enable the operating system to function. The apply script includes the configuration of a telnet port and application for security purposes. The apply script includes functions to set the interrupt balance for the operating system. The network layer apply script verifies any network interfaces (e.g. bonded vs. unbonded), verifies that the interfaces are not configured for Ipv6, and generates an additional script, which when executed, will apply standard networking settings to the networking components of the servers 410-420.

Once a script has been obtained it may be assigned to a specific layer version. In particular, a table entry matching the particular cluster and layer for which the obtained apply script corresponds may be identified, and subsequently updated with a reference to the script. For example, the Configuration Management table 800 of FIG. 8 may be updated to include reference to any obtained scripts, such as "v1-bond 2.08", included as a reference to the CM-network layer. Alternatively, if the apply script corresponds to a new cluster, the Configuration Management table 800 may be updated to include the new cluster, and a configuration for one or more layers.

Referring again to FIG. 7, once a script has been obtained and assigned to a layer for the cluster, a repair automation system may be executed to process any layers corresponding to the cluster to initiate configuration of the cluster (operation 708). For example, referring to FIG. 5, in one embodiment, the configuration application 524 may execute a repair automation "configure" process that initiates the repair automation system 530 to initiate the various configurations. In particular, the repair automation system 530 may access the various layers corresponding to a cluster and execute any referenced scripts, or other configurations within the layer. The executed scripts, in turn, may execute the necessary packages and/or otherwise access the configuration code located within the repository 430 of the configuration management system 524 to configure the cluster. For example, and in one embodiment, when initiating a configuration procedure, a resource name may be provided to the repair automation system 530. Subsequently, the repair automation system 530 identifies the cluster in which the resource is located and uses the cluster name to identify the layer version from the Configuration Management table (e.g. table 800). Typically, one variable of the layer version is the script "settings" variable. Thus, the repair automation system 530 processes the layer version, and identifies the name of the script. For example, referring to FIGS. 5 and 8, the repair automation system 530 may process CM-Network layer of cluster 508 (i.e. 201200.X) and identify the reference to script v1-bond, 2.08, which when executed will access code within the repository 528 to apply the desired network configurations to one or more of the servers 510-520 included within the cluster 508 (i.e. 201200.X).

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for configuration management comprising:
accessing a script corresponding to a cluster of resources within a communications network, wherein the script defines a configuration for the cluster and comprises at least one verification function that, when executed, verifies an internal configuration of the resources of the cluster;
assigning the script to a specific version of at least one layer of a plurality of layers defining a configurable aspect of the cluster, wherein the plurality of layers comprises a hardware layer, a bios layer, an operating system layer, a network layer, a system admin layer, and an application layer; and
initiating configuration of the at least one layer of the cluster, wherein the verification function is executed to verify the internal configuration of the resources of the cluster.

2. The method of claim 1, further comprising:
identifying a cluster name corresponding to the cluster based on a resource name of at least one resource of the cluster of resources;
identifying the at least one layer based on the cluster name;
processing the at least one layer to identify the script; and
initiating configuration of the at least one layer of the cluster by executing the identified script to apply the defined configuration to the cluster for the specific version of the layer.

3. The method of claim 1, wherein assigning the script comprises:
defining a reference to the script within a table of a database, the database maintaining which version of the at least one layer may be applied to the cluster in conjunction with the script.

4. The method claim 1, wherein the at least one layer includes at least one variable corresponding to the specific version of the at least one layer, the at least one variable defining the configurable aspect of the cluster.

5. The method of claim 1, wherein the script is part of a package, and wherein the package is in a red hat package format.

6. A configuration management system comprising:
at least one processor;
a memory configured to store instructions for execution by the at least one processor, wherein the at least one processor is operable to execute the instructions to:
access a script corresponding to a cluster of resources within a communications network, wherein the script defines a configuration for the cluster, the script stored in a repository, and comprises at least one verification function that, when executed, verifies an internal configuration of the resources of the cluster;
assign the script to a specific version of at least one layer of a plurality of layers defining a configurable aspect of the cluster, wherein the plurality of layers comprises a hardware layer, a bios layer, an operating system layer, a network layer, a system admin layer, and an application layer; and initiating configuration of the at least one layer of the cluster, wherein the verification function is executed to verify the internal configuration of the resources of the cluster.

7. The system of claim 6, wherein the at least one processor is further configured to:
identify a cluster name corresponding to the cluster based on a resource name of at least one resource of the cluster of resources;
identify the at least one layer based on the cluster name;
process the at least one layer to identify the script; and
initiate configuration of the at least one layer of the cluster by executing the script to apply the defined configuration to the cluster for the specific version of the layer.

8. The system of claim 6, wherein assigning the script comprises:
defining a reference to the script within a table of a database, the database maintaining which version of the at least one layer may be applied to the cluster in conjunction with the script.

9. The system of claim 6, wherein the script is part of a package, and wherein the package is in a red hat package format.

10. A non-transitory computer readable medium including instructions for configuration management, the instructions, executable by a processor, comprising:
accessing a script corresponding to a cluster of resources within a communications network, wherein the script defines a configuration for the cluster and comprises at least one verification function that, when executed, verifies an internal configuration of the resources of the cluster;
assigning the script to a specific version of at least one layer of a plurality of layers defining a configurable aspect of the cluster, wherein the plurality of layers comprises a hardware layer, a bios layer, an operating system layer, a network layer, a system admin layer, and an application layer; and
initiating configuration of the at least one layer of the cluster, wherein the verification function is executed to verify the internal configuration of the resources of the cluster.

11. The non-transitory computer readable medium of claim 10, wherein the instructions further comprise:
identifying a cluster name corresponding to the cluster based on a resource name of at least one resource of the cluster of resources;
identifying the at least one layer based on the cluster name;
processing the at least one layer to identify the script; and
initiating configuration of the at least one layer of the cluster by executing the script to apply the defined configuration to the cluster for the specific version of the layer.

12. The non-transitory computer readable medium of claim 10, wherein assigning the script comprises:
defining a reference to the script within a table of a database, the database maintaining which version of the at least one layer may be applied to the cluster in conjunction with the script.

13. The non-transitory computer readable medium of claim 10, wherein the script is part of a package, and wherein the package is in a red hat package format.

14. The non-transitory computer readable medium of claim 10, wherein the at least one layer includes at least one variable corresponding to the specific version of the at least one layer, the at least one variable defining the configurable aspect of the cluster.

* * * * *